(12) United States Patent
Shin

(10) Patent No.: US 8,718,846 B2
(45) Date of Patent: May 6, 2014

(54) SYSTEM FOR CONTROLLING ENGINE STARTING OF HYBRID VEHICLE AND METHOD THEREOF

(75) Inventor: Sanghee Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 648 days.

(21) Appl. No.: 12/946,105

(22) Filed: Nov. 15, 2010

(65) Prior Publication Data

US 2011/0320076 A1    Dec. 29, 2011

(30) Foreign Application Priority Data

Jun. 24, 2010   (KR) .................. 10-2010-0060092

(51) Int. Cl.
*B60L 9/00* (2006.01)

(52) U.S. Cl.
USPC .............................. 701/22; 701/113; 701/101

(58) Field of Classification Search
USPC ......... 701/22, 101, 113; 903/902; 180/65.265
See application file for complete search history.

(56) References Cited

U.S. PATENT DOCUMENTS

| | | | |
|---|---|---|---|
| 7,351,173 B2 * | 4/2008 | Uchisasai et al. | 475/5 |
| 2006/0068972 A1 * | 3/2006 | Uchisasai et al. | 477/46 |
| 2007/0102211 A1 | 5/2007 | Nozaki et al. | |
| 2009/0234524 A1 * | 9/2009 | Kim | 701/22 |
| 2010/0082220 A1 * | 4/2010 | Whitney et al. | 701/102 |
| 2010/0228412 A1 * | 9/2010 | Sah | 701/22 |
| 2010/0251707 A1 * | 10/2010 | Sah et al. | 60/486 |

FOREIGN PATENT DOCUMENTS

| | | |
|---|---|---|
| JP | 2007-069790 A | 3/2007 |
| KR | 10-2000-0019323 A | 4/2000 |
| KR | 10-2009-0098318 A | 9/2009 |

* cited by examiner

*Primary Examiner* — Behrang Badii
*Assistant Examiner* — Daniel L Greene
(74) *Attorney, Agent, or Firm* — Edwards Wildman Palmer LLP; Peter F. Corless

(57) ABSTRACT

The present invention relates to a system for controlling engine starting of a hybrid vehicle and a method thereof which prevents torque impact when controlling the engine starting by using a clutch slip. In an exemplary embodiment, the present invention includes: determining whether a starting condition using a clutch slip is satisfied by analyzing information of the hybrid vehicle; determining, in a state that the starting condition using the clutch slip is satisfied, whether a shift-speed is higher than or equal to a predetermined shift-speed; upshifting to the predetermined shift-speed in a case that the shift-speed is lower than the predetermined shift-speed; controlling the clutch slip by supplying hydraulic pressure to the clutch; and controlling the engine starting by fuel injection and ignition control in a case that the engine speed is faster than a predetermined engine speed.

13 Claims, 3 Drawing Sheets

SYSTEM FOR CONTROLLING ENGINE STARTING OF HYBRID VEHICLE AND METHOD THEREOF

CROSS-REFERENCE TO RELATED APPLICATION

This application claims priority to and the benefit of Korean Patent Application No. 10-2010-0060092 filed in the Korean Intellectual Property Office on Jun. 24, 2010, the entire contents of which are incorporated herein by reference.

BACKGROUND OF THE INVENTION (a) Field of the Invention

The present invention relates to a hybrid vehicle. More particularly, the present invention relates to a system for controlling engine starting of a hybrid vehicle and a method thereof which prevents torque impact when controlling the engine starting by using a clutch slip.

(b) Description of the Related Art

Research into eco-friendly vehicles has increased because of the demands for enhancement of fuel efficiency and reinforcement of exhaust gas regulations. A hybrid vehicle is one type of eco-friendly vehicle that has attracted public attention.

Hybrid vehicles use an engine and a motor as power sources. By selectively using the engine and motor as the power sources, hybrid vehicles are capable of enhancing energy efficiency and reducing exhaust gas.

In order to minimize cost and torque loss in hybrid vehicles, a clutch operated by fluid, instead of a torque converter, is mounted between the engine and the motor. In addition, an idle stop and go (ISG) device can be mounted in the hybrid vehicle. The ISG device stops the engine in an idle state and restarts the engine when the engine should be operated according to a driver's will and the vehicle's conditions. Therefore, the ISG device further enhances fuel efficiency and reduces exhaust gas.

In a hybrid vehicle, the engine is started by using the ISG device or by slipping the clutch, which is located between the engine and the motor, when the vehicle speed is faster than a predetermined vehicle speed. If the shift-speed is low in an automatic transmission (for example, the first forward speed or the second forward speed) or the ratio of an output speed to an input speed (i.e., speed ratio) is high (for example, 3:1) in a continuously variable transmission, then when the engine is started by using the clutch slip, frictional resistance of the engine is transmitted to the vehicle body as a large torque and vibration occurs. Therefore, if the engine is started by using the clutch slip, driving performance and ride comfort may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for controlling engine starting of a hybrid vehicle and a method thereof. In particular, the present system and method provides the advantages of preventing torque impact by frictional resistance of an engine which occurs when a shift-speed (or a speed ratio) is temporarily adjusted when the engine is started using a clutch slip.

According to one aspect of the present invention, a system for controlling engine starting of a hybrid vehicle is provided which comprises an engine being a first power source, a motor being a second power source, a clutch selectively connecting the engine with the motor, a mechanism (such as a solenoid valve) for supplying hydraulic pressure to the clutch, and a transmission. The system may include a hybrid control unit for adjusting a shift-speed to be higher than or equal to a predetermined shift-speed, or adjusting a speed ratio to be lower than or equal to a predetermined speed ratio when a starting condition using a clutch slip is satisfied. In preferred embodiments, the hybrid control unit controls the clutch slip by supplying hydraulic pressure to the clutch, and further performs fuel injection and ignition control so as to start the engine when an engine speed is faster than or equal to a predetermined engine speed.

In a preferred embodiment, the starting condition using the clutch slip may be satisfied when the vehicle speed is higher than or equal to a predetermined vehicle speed, a shift lever is positioned at a drive (D) range, and the clutch and the transmission system operate normally.

In a preferred embodiment, the hybrid control unit can detect a load loss of the motor from the clutch slip and can compensate torque of the motor based on the load loss so as to maintain a constant torque.

In a further preferred embodiment, the hybrid control unit can upshift the shift-speed to be higher than or equal to a predetermined shift-speed in an engine starting state by using the clutch slip. As such, friction loss of the engine can be reduced, and preferably minimized.

In a further preferred embodiment, the hybrid control unit can control the speed ratio to be lower than or equal to a predetermined speed ratio in an engine starting state by using the clutch slip. As such, friction loss of the engine can be further reduced, and preferably minimized.

Preferably, the hybrid control unit can further compensate the hydraulic pressure for the clutch slip according to the oil temperature.

In a preferred embodiment, upon completion of engine starting using the clutch slip, the hybrid control unit may release the hydraulic pressure from the clutch, control the engine to be an idle state, and recover the shift-speed to be an original shift-speed (i.e. prior to adjustment) or the speed ratio to be an original speed ratio (i.e. prior to adjustment).

According to another aspect of the present invention, a method for controlling engine starting of a hybrid vehicle is provided. In a preferred embodiment, the method may include: determining whether a starting condition using a clutch slip is satisfied by analyzing information of the hybrid vehicle; if the starting condition using the clutch slip is satisfied, determining whether the shift-speed is higher than or equal to a predetermined shift-speed; upshifting to the predetermined shift-speed if the shift-speed is lower than the predetermined shift-speed; controlling the clutch slip by supplying hydraulic pressure to the clutch; and controlling the engine starting by fuel injection and ignition control if the engine speed is faster than a predetermined engine speed.

According to another preferred embodiment of the present invention, the method may include: determining whether a starting condition using a clutch slip is satisfied by analyzing information of the hybrid vehicle; if the starting condition using the clutch slip is satisfied, determining whether the speed ratio is higher than a predetermined speed ratio; adjusting the speed ratio to be lower than or equal to the predetermined speed ratio if the speed ratio is higher than the predetermined speed ratio; controlling the clutch slip by supplying hydraulic pressure to the clutch; and controlling the engine starting by fuel injection and ignition control if the engine speed is faster than a predetermined engine speed.

According to a preferred method, the starting condition using the clutch slip may be satisfied when the vehicle speed is higher than or equal to a predetermined vehicle speed, a shift lever is positioned at a drive (D) range, and the clutch and the transmission system operate normally.

According to preferred methods, torque of the motor may be compensated according to a load loss of the motor when controlling the clutch slip.

In accordance with a preferred method, the hydraulic pressure supplied to the clutch may further be compensated according to the oil temperature.

In preferred methods, upon completion of engine starting using the clutch slip, hydraulic pressure may then be released from the clutch, the engine may then be controlled to be an idle state, and the shift-speed may then be returned to the original shift-speed (i.e. prior to adjustment) or the speed ratio may then be returned to the original speed ratio (i.e. prior to adjustment).

According to the present invention, torque impact is reduced and even eliminated when the engine is started by using the clutch slip. Therefore, driving stability and reliability is enhanced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

DESCRIPTION OF SYMBOLS

Figure 1:
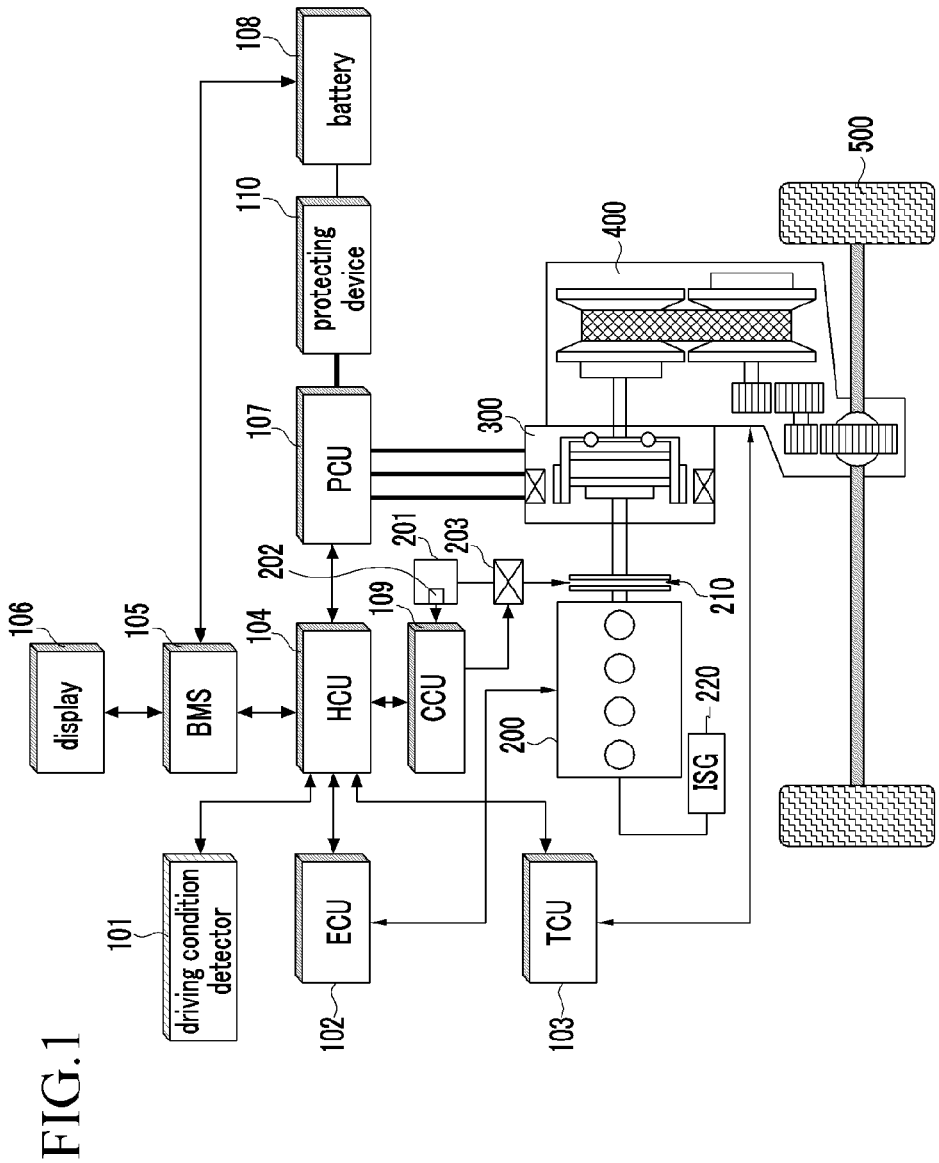
FIG. 1 is a schematic diagram of a system for controlling engine starting of a hybrid vehicle according to an exemplary embodiment of the present invention.

| | |
|---|---|
| 101: driving condition detector | 102: ECU |
| 103: TCU | 104: HCU |
| 105: BMS | 106: display |
| 107: PCU | 108: battery |
| 109: CCU | 110: protecting device |
| 200: engine | 203: solenoid valve |
| 300: motor | 400: transmission |

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

FIG. 1 is a schematic diagram of a system for controlling engine starting of a hybrid vehicle according to an exemplary embodiment of the present invention.

As shown in FIG. 1, the system includes a driving condition detector 101, an engine control unit (ECU) 102, a transmission control unit (TCU) 103, a hybrid control unit (HCU) 104, a battery management system (BMS) 105, a display 106, a power control unit (PCU) 107, battery 108, a clutch control unit (CCU) 109, a protecting device 110, an engine 200, an oil tank 201, an oil temperature sensor 202, a solenoid valve 203, a clutch 210, a motor 300, and a transmission 400.

In accordance with this embodiment, the HCU is the uppermost controller. The driving condition detector 101 detects information with respect to the driving condition, such as, but not limited to, displacement of an accelerator pedal which a driver operates, on/off states of a clutch pedal, on/off states of a brake pedal, and a position of a shift lever. The driving detector 101 transmits the information to the HCU 104 through a network.

Based on the information of the driving condition received from the HCU 104, the ECU 102 controls operation of the engine 200. In particular, the ECU 102 controls the engine 200 such that an operating efficiency of the engine 200 is between a minimum operating efficiency and a maximum operating efficiency. The ECU 102 then transmits engine 200 information to the HCU 104.

Further in accordance with this embodiment, the TCU 103 mutually communicates with the HCU 104 through the network, and controls the shift-speed (or speed ratio) of the transmission 400 according to information such as a current vehicle speed, a current gear ratio, oil temperature, the driving condition, and so on.

The HCU 104, which is the uppermost controller, is configured to control the overall operation of the hybrid vehicle by controlling lower controllers (e.g. ECU, TCU, PCU, CCU) which are connected thereto through the network, and to gather and analyze information of the lower controllers.

According to preferred embodiments, the HCU 104 operates the clutch 210 according to a drive mode so as to selectively connect or disconnect the engine 200 and the motor 300, and thereby, controls the output of suitable torque.

Further, the HCU 104 temporarily adjusts the shift-speed (or speed ratio) and starts the engine when needed by using a clutch slip when the starting condition using the clutch slip is satisfied, In accordance with the present methods, when the engine is started the HCU 104 further reduces or minimizes a frictional resistance of the engine 200 and reduces or prevents the occurrence of torque impact.

Further, the HCU 104 starts the engine 200 by using the clutch slip when the ISG 220 is out of order or when the vehicle speed is faster than or equal to a predetermined vehicle speed.

Further, in accordance with preferred embodiments, the HCU 104 detects the shift-speed and upshifts the shift-speed to be higher than or equal to a predetermined shift-speed (for example, third forward speed) so as to minimize the frictional force of the engine 200, which is operated as a load in an automatic transmission, when the starting condition using the clutch slip is satisfied.

Further, in accordance with preferred embodiments, the HCU 104 detects the speed ratio and adjusts the speed ratio to be lower than a predetermined speed ratio (for example, 3:1) so as to minimize the frictional force of the engine 200, which is operated as the load in a CVT, when the starting condition using the clutch slip is satisfied.

In accordance with the present invention, the HCU 104 compensates for load loss of the motor 300 generated by the clutch slip when the engine 200 is started, and preferably maintains the total torque of the vehicle at a constant level. Thereby, stable drivability may be maintained.

In preferred embodiments, the HCU 104 performs fuel injection and ignition control when the engine speed is faster than a predetermined engine speed (for example, 200 RPM which is a starting RPM) by the clutch slip.

Further, once the engine 200 is started, the HCU 104 releases the clutch slip control, controls the engine 200 to be an idle state, and returns the shift-speed to the original shift-speed (prior to adjustment) or the speed ratio to the original speed ratio (prior to adjustment).

According to the embodiment shown in FIG. 1, the BMS 105 detects information about the voltage, current, and temperature of the battery 108, which is the power source, so as to control recharging of the battery 108. The BMS 105 further controls a recharge current or a discharge current of the battery 108 so as to prevent excessive recharge or excessive discharge.

As shown in the embodiment of FIG. 1, a display 106 can be provided such that all the driving information of the vehicle can be shown in the display 106.

As shown in FIG. 1, a PCU 107 is further provided, which includes a motor control unit (MCU) and an inverter provided with a plurality of electric switching elements. As the electric switching elements, one or more insulated gate bipolar transistors (IGBT), a MOSFET, and/or transistors can be provided. In a preferred embodiment, an IGBT is used as an electric switching element. The PCU 107 converts DC voltage supplied from the battery 108 into 3-phase AC voltage according to a control signal transmitted from the HCU 104 to thereby drive the motor 300. The PCU 107 can further operate the motor 300 as a generator so as to recharge the battery 108. In a preferred embodiment, the battery 108 supplies voltage to the motor 300 which assists output of the engine 200, and the battery is recharged by the voltage generated in the motor 300.

As further shown in the embodiment of FIG. 1, a CCU 109 is provided in connection with the clutch 210. In particular, the clutch 210 is operated by control of the CCU 109 such that the engine 200 is either connected to or disconnected from the motor 300. In addition, if the clutch 210 slips, the torque of the motor 300 can be partially transmitted to the engine 200 to thereby rotate the engine 200. In a preferred embodiment, the CCU 109 controls hydraulic pressure supplied to the clutch. For example, as shown in the embodiment of FIG. 1, the CCU 109 can be in connection with a solenoid valve 203 or the like, so as to turn the solenoid valve 203 on or off according to the control of the HCU 104, thereby controlling the hydraulic pressure supplied to the clutch 210. A fluid for operating the clutch 210 and the transmission 400 can be stored, for example, in an oil tank 201. An oil temperature sensor 202 can further be mounted in the oil tank 201 to detect the temperature of the fluid, and the detected value can then be transmitted to the CCU 109. The solenoid valve 203 can be turned on or off by the CCU 109 so as to control the fluid amount supplied to the clutch 210.

As shown in FIG. 1, a protecting device 110 can further be mounted between the PCU 107 and the battery 108 so as to monitor the current flowing between the PCU 107 and the battery 108. Thus, for example, if an overcurrent flows or an overvoltage is applied to the PCU 107 and the battery 108, the protecting device 110 can disconnect the battery 108 from the PCU 107 so as protect the systems in the hybrid vehicle.

In accordance with the present invention, the engine 200 operates within the minimum operating efficiency and the maximum operating efficiency by the control of the ECU 102.

According to the embodiment shown in FIG. 1, the motor 300 is driven by the 3-phase AC voltage according to the control of the PCU 107 so as to assist the output torque of the engine 200, and so as to operate as a generator if, for example, the output of the engine 200 is excessive or the vehicle brakes.

As shown, a transmission 400 is further provided to adjust the shift-speed (or the speed ratio) according to the control of the TCU 103, and so as to transmit the output torque to a driving wheel 500 by selectively summing up torques of the engine 200 and the motor 300 according to the drive mode so as to run the vehicle. The transmission 400 further performs a shift to the predetermined shift-speed according to the control of the TCU 103 when the engine 200 is started by using the clutch slip.

In accordance with the present invention, a conventional automatic transmission or CVT may be used as the transmission 400.

In accordance with the present invention, the general operation of the hybrid vehicle can be the same as or similar to operation of conventional hybrid vehicles, which is known. As such, a detailed description regarding such conventional operation of hybrid vehicles will be omitted.

The present methods for engine starting by using the clutch slip will now be described, particularly with reference to FIG. 2 and FIG. 3, which show flowcharts of methods according to exemplary embodiments of the present invention.

Figure 2:
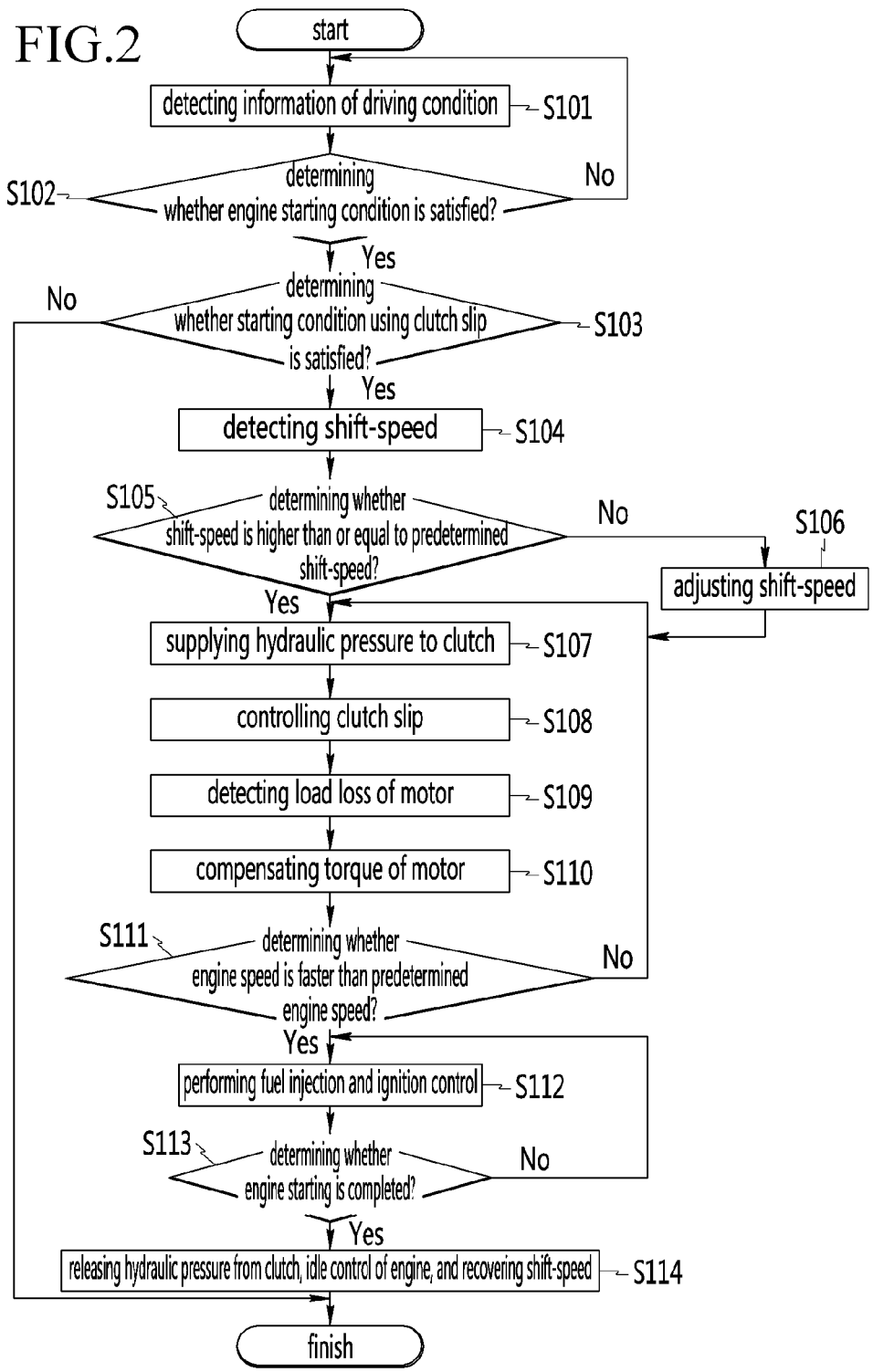
FIG. 2 is a flowchart of a method for controlling engine starting of a hybrid vehicle according to another exemplary embodiment of the present invention.
Figure 3:
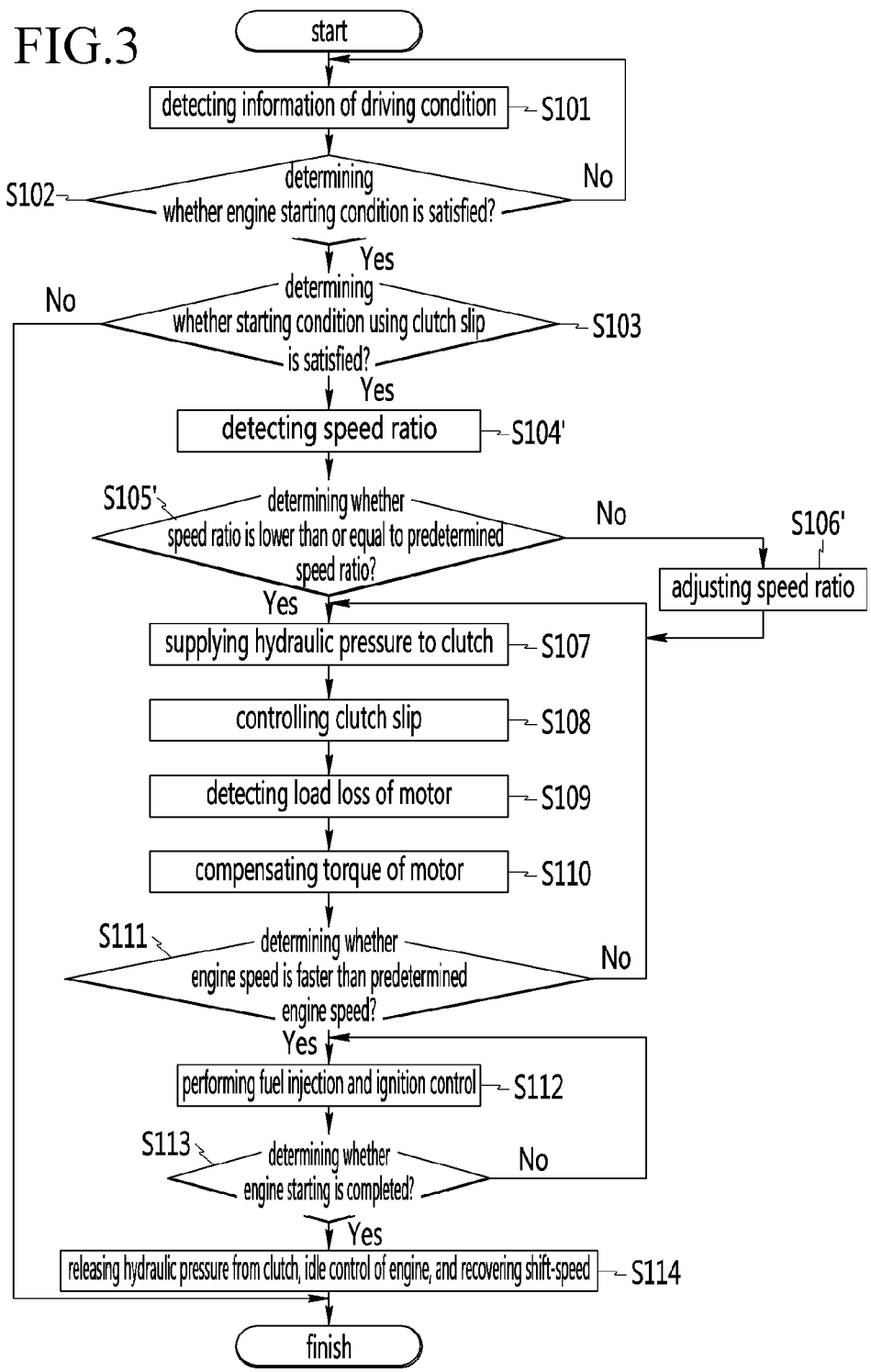
FIG. 3 is a flowchart of a method for controlling engine starting of a hybrid vehicle according to other embodiment of the present invention.

Referring to FIG. 2 and FIG. 3, the HCU 104 (the uppermost controller) detects and analyzes information with respect to the driving conditions transmitted from the lower controllers (e.g. ECU, TCU, PCU, CCU) which are connected thereto through a network (step S101) and determines whether the engine starting condition is satisfied (step S102).

When the engine starting condition is satisfied at step S102, the HCU 104 determines whether a starting condition using the clutch slip is satisfied (step S103).

In accordance with an embodiment of the present invention, the starting condition using the clutch slip may be satisfied when the vehicle speed is faster than or equal to a predetermined vehicle speed (for example, 15 Km/h), the shift lever is positioned at the drive range (D range), and the clutch and the transmission system operate normally. Further, if the ISG 220 is out of order, the engine 200 is started by using the clutch slip.

According to an exemplary embodiment of the present invention, if the starting condition using the clutch slip is not satisfied at step S103, then the method is finished. If the starting condition using the clutch slip is satisfied at step S103, then the TCU 103 detects the shift-speed (step S104) and determines whether the detected shift-speed is higher than or equal to a predetermined shift-speed (step S105). For example, in an exemplary embodiment, the predetermined shift-speed may be set as the third forward speed.

If the shift-speed is lower than the predetermined shift-speed at step S105, then the HCU 104 adjusts the shift-speed to be higher than or equal to the predetermined shift-speed through the TCU 103, so as to minimize the frictional force of the engine 200 which is operated as the load when starting at step S106. For example, in an exemplary embodiment, the TCU 103 upshifts the current shift-speed to be higher than or equal to the third forward speed.

The above-mentioned steps S104 to S106 can be performed in a hybrid vehicle in which an automatic transmission is provided.

If a CVT is provided, the TCU 103 determines whether the speed ratio is lower than or equal to a predetermined speed ratio (please refer to FIG. 3) at step S105'. According to a preferred embodiment, the predetermined speed ratio may be set as 3:1. If the speed ratio is higher than a predetermined speed ratio, the TCU 103 adjusts the speed ratio to be lower than or equal to the predetermined speed ratio, so as to minimize the frictional force of the engine 200 which is operated as the load (step S106').

If the shift-speed is higher than or equal to the predetermined shift-speed at step S105/S105' or the shift-speed is adjusted to be higher than or equal to the predetermined shift-speed at step S106, or if the speed ratio is adjusted to be lower than or equal to the predetermined speed ratio at step S106', then the HCU 104 controls the solenoid valve 203 through the CCU 109 to supply hydraulic pressure to the clutch 210 (step S107).

At this time, the hydraulic pressure supplied to the clutch 210 is compensated according to the oil temperature.

The clutch 210 is then controlled to slip by the torque of the motor 300 (step S108). When the clutch 210 slips, load of the motor 300 is lost, and the HCU 104 detects the load loss of the motor 300 (step S109).

The HCU 104 then compensates the torque of the motor 300 through the PCU 107 (step S110), such that and the total torque of the vehicle is maintained to be constant.

The ECU 102 then determines whether the engine speed is faster than a predetermined engine speed, for example, 200 RPM which is a starting speed of the engine 200 (step S111).

If the engine speed is slower than or equal to the predetermined engine speed at step S111, the method is returned to step S107. If the engine speed is faster than the predetermined engine speed at step S111, the HCU 104 performs fuel injection and ignition control so as to start the engine 200 through the ECU 102 (step S112).

It is then determined whether the engine starting is completed (step S113). If engine starting is completed (S113), the hydraulic pressure supplied to the clutch 210 is released, the engine 200 is controlled to be an idle state, and the shift-speed is recovered to the original shift-speed (prior to adjustment S106/S106') or the shift-speed is adjusted according to a current driving condition (step S114).

According to the present invention, when an engine is started using clutch slip, a shift-speed is adjusted to be a higher shift-speed to thereby reduce or minimize frictional force of the engine and further reduce or eliminate torque impact when starting the engine starting.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling engine starting of a series hybrid vehicle which comprises an engine being a first power source, a motor being a second power source, a clutch disposed between the engine and the motor to selectively connect the engine with the motor, a solenoid valve supplying hydraulic pressure to the clutch, and a transmission, the system comprising a hybrid control unit configured to adjust a shift-speed to be higher than or equal to a predetermined shift-speed or adjust a speed ratio to be lower than or equal to a predetermined speed ratio when a starting condition using a clutch slip is satisfied, control the clutch slip by supplying the hydraulic pressure to the clutch, and perform fuel injection and ignition control so as to start the engine when an engine speed is faster than or equal to a predetermined engine speed wherein the hybrid control unit up shifts the shift-speed to be higher than or equal to the predetermined shift-speed or lowers the speed ratio to be lower than or equal to a predetermined speed ratio during the engine starting by using the clutch slip so as to minimize a friction loss of the engine.

2. The system of claim 1, wherein the starting condition using the clutch slip is satisfied when a vehicle speed is higher than or equal to a predetermined vehicle speed, a shift lever is positioned at a drive (D) range, and the clutch and the transmission system operate normally.

3. The system of claim 1, wherein the hybrid control unit detects a load loss of the motor according to the clutch slip and compensates torque of the motor according to the load loss so as to maintain a constant torque.

4. The system of claim 1, wherein the hybrid control unit upshifts the shift-speed to be higher than or equal to the predetermined shift-speed in a state of the engine starting by using the clutch slip so as to minimize a friction loss of the engine.

5. The system of claim 1, wherein the hybrid control unit controls the speed ratio to be lower than or equal to the predetermined speed ratio in a state of the engine starting by using the clutch slip so as to minimize a friction loss of the engine.

6. The system of claim 1, wherein the hybrid control unit compensates the hydraulic pressure for the clutch slip according to an oil temperature.

7. The system of claim 1, wherein the hybrid control unit is further configured to release the hydraulic pressure from the clutch, control the engine to be an idle state, and recover the shift-speed to be an original shift-speed or the speed ratio to be an original speed ratio after the engine starting using the clutch slip is completed.

8. A method for controlling engine starting of a series hybrid vehicle, comprising:
   determining, by a hybrid control unit, whether a starting condition using a clutch slip is satisfied by analyzing information of the hybrid vehicle;
   when the starting condition using the clutch slip is satisfied, determining, by the hybrid control unit, whether a shift-speed is higher than or equal to a predetermined shift-speed;
   upshifting, by the hybrid control unit, to the predetermined shift-speed if the shift-speed is lower than the predetermined shift-speed;
   controlling, by the hybrid control unit, the clutch slip by supplying hydraulic pressure to a clutch; and
   controlling, by the hybrid control unit, the engine starting by fuel injection and ignition control if the engine speed is faster than a predetermined engine speed.

9. The method of claim 8, wherein the starting condition using the clutch slip is satisfied when the vehicle speed is higher than or equal to a predetermined vehicle speed, a shift lever is positioned at a drive (D) range, and the clutch and the transmission system operate normally.

10. The method of claim 8, wherein torque of the motor is compensated according to a load loss of the motor when controlling the clutch slip.

11. The method of claim 8, wherein the hydraulic pressure supplied to the clutch is compensated according to an oil temperature.

12. The method of claim 8 further comprising releasing the hydraulic pressure from the clutch, controlling the engine to be an idle state, and returning the shift-speed to the shift-speed prior to upshifting when the engine starting using the clutch slip is completed.

13. A method for controlling engine starting of a series hybrid vehicle, comprising:
- determining, by a hybrid control unit, whether a starting condition using a clutch slip is satisfied by analyzing information of the hybrid vehicle;
- when the starting condition using the clutch slip is satisfied, determining, by the hybrid control unit, whether a speed ratio is higher than a predetermined speed ratio;
- adjusting, by the hybrid control unit, the speed ratio to be lower than or equal to the predetermined speed ratio if the speed ratio is higher than the predetermined speed ratio;
- controlling, by the hybrid control unit, the clutch slip by supplying hydraulic pressure to a clutch; and
- controlling, by the hybrid control unit, the engine starting by fuel injection and ignition control if the engine speed is faster than a predetermined engine speed.

* * * * *